(12) United States Patent
Musuluri

(10) Patent No.: US 10,521,461 B2
(45) Date of Patent: Dec. 31, 2019

(54) SYSTEM AND METHOD FOR AUGMENTING A SEARCH QUERY

(71) Applicant: Aravind Musuluri, Johns Creek, GA (US)

(72) Inventor: Aravind Musuluri, Johns Creek, GA (US)

( * ) Notice: Subject to any disclaimer, the term of this patent is extended or adjusted under 35 U.S.C. 154(b) by 71 days.

(21) Appl. No.: 14/942,076

(22) Filed: Nov. 16, 2015

(65) Prior Publication Data

US 2016/0140214 A1   May 19, 2016

Related U.S. Application Data

(60) Provisional application No. 62/079,650, filed on Nov. 14, 2014.

(51) Int. Cl.
*G06F 17/30* (2006.01)
*G06F 16/332* (2019.01)
*G06F 16/951* (2019.01)

(52) U.S. Cl.
CPC ........ *G06F 16/3323* (2019.01); *G06F 16/951* (2019.01)

(58) Field of Classification Search
CPC ................ G06F 17/30643; G06F 16/3323
USPC .......................................... 707/767
See application file for complete search history.

(56) References Cited

U.S. PATENT DOCUMENTS

| | | | | |
|---|---|---|---|---|
| 7,181,438 B1* | 2/2007 | Szabo | ............... | G06F 17/30522 |
| 7,788,260 B2* | 8/2010 | Lunt | .................. | G06Q 30/0275 707/727 |
| 8,150,825 B2* | 4/2012 | Diab | ................ | G06F 16/24578 707/706 |
| 8,346,791 B1* | 1/2013 | Shukla | ................ | G06F 16/3325 707/759 |
| 8,417,712 B2* | 4/2013 | Narayanan | ........ | G06F 17/30265 707/749 |
| 2005/0216454 A1* | 9/2005 | Diab | .................. | G06F 16/24578 |
| 2009/0265334 A1* | 10/2009 | Narayanan | .............. | G06F 16/58 |
| 2014/0156262 A1* | 6/2014 | Yuen | ................. | G06F 17/30675 704/9 |
| 2014/0310255 A1* | 10/2014 | Cardell | ............ | G06F 17/30864 707/706 |
| 2015/0339307 A1* | 11/2015 | Hultgren | ............... | G06F 3/0481 707/724 |
| 2016/0140214 A1* | 5/2016 | Musuluri | .......... | G06F 17/30643 707/767 |

\* cited by examiner

*Primary Examiner* — Sheree N Brown

(57) ABSTRACT

System and method for augmenting a search query by identifying at least one visual element suggestion for the search query is disclosed.

2 Claims, 5 Drawing Sheets

400

| Keyword(s) | Visual Element | Visual Element Occurances |
|---|---|---|
| Diabetes |  —302 | 4 |
| Diabetes |  —301 | 5 |
| Diabetes |  | 3 |

SYSTEM AND METHOD FOR AUGMENTING A SEARCH QUERY

CROSS REFERENCE TO RELATED APPLICATION

This application claims priority to U.S. Provisional Application Ser. No. 62/079,650 entitled "System and Method For Augmenting A Search Query" filed on Nov. 14, 2014, which is incorporated herein by reference.

TECHNICAL FIELD

The present disclosure generally relates to search engines and a method of retrieving search results based on a search query. More particularly, the disclosure relates to augmenting a search query by identifying at least one pertinent visual element for the search query.

BACKGROUND

The statements in this section merely provide background information related to the present disclosure and may not constitute prior art.

Search engines assist users in retrieving relevant data from data sources. The data source herein may refer to data and/or document(s) on the Internet, intranet, storage devices, and so on. In order to use a search engine, a user seeking information on a desired topic generally inputs a search query relevant to the topic into the search interface of the search engine. Generally a search query may comprise keyword(s) or phrase(s), visual element(s) and combination thereof. Once the search query is received, the search engine identifies documents in a data source that are relevant to the search query and displays a report with a prioritized list of links pointing to relevant documents containing the search keywords.

Known search engines like Google®, Bing®, Yahoo®, etc. have provided a variety of functionalities to improve the user experience and speedup the search process. One such functionality is providing for search query suggestions on the search results page or as the user incrementally types in the search query in the input box of a search interface. These search query suggestions may be available as a list or drop down list and the user may select one of the search query suggestions to initiate the search. The user can also ignore the search query suggestions and continue to input the search query. While these search query suggestions are very useful to the users, there is a need to provide additional improvements that can further not only speedup the search but also improve the quality of the results.

SUMMARY

The following presents a simplified summary of the disclosure in order to provide a basic understanding to the reader. This summary is not an extensive overview of the disclosure and it does not identify key/critical elements of the disclosure or delineate the scope of the disclosure. Its sole purpose is to present some concepts disclosed herein in a simplified form as a prelude to the more detailed description that is presented later.

According to the aspects related herein, the present disclosure relates to method of augmenting a search query by automatically identifying at least one visual element suggestion for the search query. In one embodiment, there may be more than one identified visual element suggestion.

The visual elements in accordance with the present disclosure may include, but are not limited to, paragraph, table, list, menu, fixed width text, key/value, graph/chart, question/answer, timeline, interactive data and combinations thereof.

The visual element suggestions in accordance with the invention may be identified on the basis of historical search data. The historical data may be selected from the group comprising but not limited to historical search queries of the corresponding user, historical search queries of a group of users or historical search queries of all the users.

In a preferred embodiment, the visual element suggestions may be identified by computing the number of occurrences of each visual element in the historical search queries with the same keywords as the search query. For visual elements which have equal number of occurrences in the historical data, either all or any one of such visual elements may be identified.

In a further preferred embodiment, the visual element suggestions may be identified on the basis of highest number of occurrences of each visual element in the historical search queries with the same keywords as the search query.

In one embodiment, the visual element suggestion may be automatically appended to the search query. In another embodiment, the visual element suggestions may be presented to the user to choose from.

In accordance with one or more preferred embodiments, a system comprising a search engine unit is provided. The search engine unit may comprise one or more logics configured to perform the functions and operations associated with the above disclosed means.

In accordance with one or more preferred embodiments, a computer program product executable in a memory of a search engine unit is provided.

BRIEF DESCRIPTION OF THE DRAWINGS

The drawings described herein are for illustration purposes only and are not intended to limit the scope of the present disclosure in anyway. Throughout the disclosure, like elements are represented by like reference numerals, which are given by way of illustration only and thus are not limitative of the various embodiments.

Other objects and advantages of the present disclosure will become apparent to those skilled in the art upon reading the following detailed description of the preferred embodiments, in conjunction with the accompanying drawings, wherein.

Features, elements, and aspects that are referenced by the same numerals in different figures represent the same, equivalent, or similar features, elements, or aspects, in accordance with one or more embodiments.

DETAILED DESCRIPTION

Figure 1:
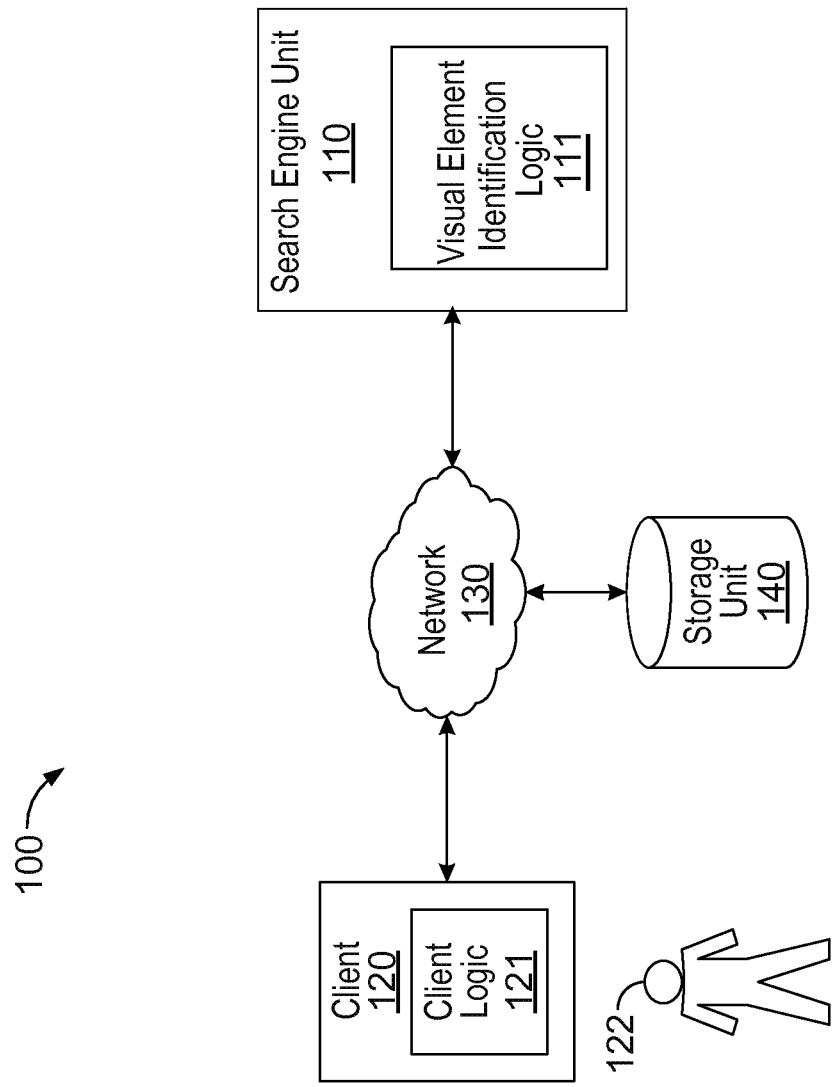
FIG. 1 is a block diagram illustrating an exemplary search suggestion environment in accordance with an embodiment of the present disclosure.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another.

The disclosure described here is equally applicable to queries from users or from systems.

The present invention relates to a method of augmenting a search query by automatically identifying at least one visual element suggestion for the search query. A visual element suggestion for a search query in accordance with the present invention includes a prioritized list of visual element types for said search query. The visual elements suggestion could be a single visual element type or a set of visual element types. The visual elements present in a document may be in general be identified by methods disclosed in US20110082868.

FIG. 1 is an exemplary search suggestion environment 100 in accordance with the present disclosure. It will be understood and appreciated by those of ordinary skill in the art that the computing system architecture 100 shown in FIG. 1 is merely an example of one suitable computing system and is not intended to suggest any limitation as to the scope of use or functionality of the present disclosure. Neither should the computing system architecture 100 be interpreted as having any dependency or requirement related to any single module/component or combination of modules/components illustrated therein.

The system 100 comprises a search engine unit 110, a client 120 and a storage unit 140. The search engine unit 110, the client 120 and the storage unit 140 all communicate over a network 130.

The network 130 can include any type of network known in the art or future-developed. In this regard, the network 130 may be an Ethernet, a local area network (LAN), or a wide area network (WAN), e.g., the Internet, or a combination of networks.

The search engine unit 110 may be a dedicated or shared server including but not limited to any type of application server, database server, or file server configurable and combinations thereof. The search engine unit 110 and the client 120 may include, but are not limited to, a computer, handheld unit, mobile unit, consumer electronic unit, or the like.

The exemplary search engine unit 110 comprises of visual element identification logic 111.

The visual element identification logic 111 upon receiving a search query, identifies the most pertinent visual element(s) for the query based on historical search queries stored in the storage unit 140 and returns the search query augmented with the visual element(s).

The storage unit 140 is configured to store information associated with automatically identifying visual element suggestions for a search query. In various embodiments, such information may include, without limitation, domains, URLs, Web Pages, websites, indexes, historical search queries, occurrences of visual elements in historical queries with the same keyword(s), user data, historical queries executed by the user, information associated therewith, and the like. In embodiments, the storage unit 140 is configured to be searchable for one or more of the items stored in association therewith. It will be understood and appreciated by those of ordinary skill in the art that the information stored in association with the storage unit 140 may be configurable and may include any information relevant to automatically identifying visual element suggestions for a search query. The content and volume of such information are not intended to limit the scope of embodiments of the present disclosure in any way. Further, though illustrated as a single, independent component, the storage unit 140 may, in fact, be a plurality of storage units, for instance a database cluster, portions of which may reside on the search engine unit 110, the client 120, another external computing device (not shown), and/or any combination thereof. Moreover, the storage unit 140 may be included within the search engine unit 110 or client 120 as a computer-storage medium. The single unit depictions are meant for clarity, not to limit the scope of embodiments in any form.

A user 122 through the client logic 121 on the client 120 may enter a search query consisting of keyword(s) which may identify the type of information that the user is interested in retrieving. The client logic 121 may comprise, for example, an Internet browser; however, other types of client logic 121 for interfacing with the user 122 and for communicating with the search engine unit 110 may be used in other embodiments of the present disclosure. The client logic 121 transmits the user search query to the search engine unit 110 via the network 130. Upon receiving the user search query, the search engine unit 110 examines the storage unit 140 and automatically assigns visual element(s) to the user search query. In one embodiment, the search engine unit 110 may transmit the user search query augmented with assigned visual elements to the client 120. In another embodiment, the search engine unit 110 may compile a prioritized list of all the documents containing all or some of the keyword(s) in the identified visual element type(s) and returns the list to the client logic 121, which displays the results to the user 122 in a window.

Note that the visual element(s) may be assigned implicitly i.e. the user may not be shown the visual element(s) and may be hidden from the user.

Figure 2:
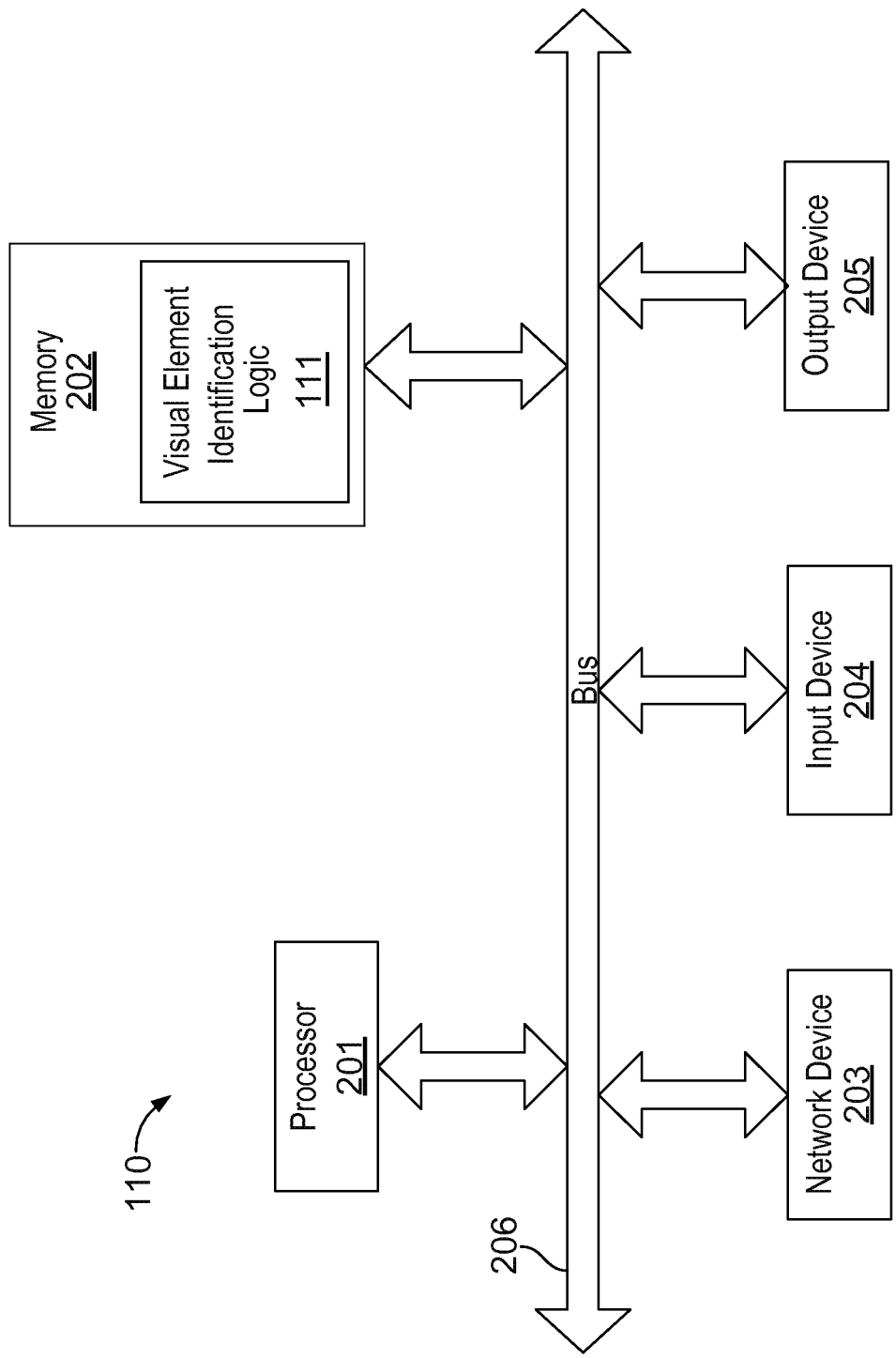
FIG. 2 is a block diagram of an exemplary computing device of FIG. 1.

FIG. 2 is an exemplary search engine unit 110 in accordance with the present disclosure. It should be noted, however, that embodiments are not limited to implementation on such computing devices, but may be implemented on any of a variety of different types of computing units within the scope of embodiments hereof. The search engine unit 110 (as shown in FIG. 1) is only one example of a suitable computing/search environment and it is not intended to suggest any limitation as to the scope of use or functionality of the disclosure.

In the exemplary embodiment, the search engine unit 110 includes a bus 206, a processor 201, memory 202, network device 203, input device 204, and an output device 205. Bus 206 may include a path that permits communication among the components of the search engine unit 110.

The memory 202 stores the visual element identification logic 111.

The memory 202 may be any type of computer memory known in the art or future-developed for electronically storing data and/or logic, including volatile and non-volatile memory. In this regard, memory 202 can include random access memory (RAM), read-only memory (ROM), flash memory, any magnetic computer storage unit, including hard disks, floppy discs, or magnetic tapes, and optical discs.

The processor 201 comprises processing hardware for interpreting or executing tasks or instructions stored in memory 202. Note that the processor 201 may be a microprocessor, a digital processor, or other type of circuitry configured to run and/or execute instructions.

The network device 203 may be any type of network unit (e.g., a modem) known in the art or future-developed for communicating over a network 130 (FIG. 1). In this regard, the search engine unit 110 (FIG. 1) communicates with the storage unit 140 (FIG. 1) and the client 120 (FIG. 1) over the network 130 (FIG. 1) via the network device 203.

The input device 204 is any type of input unit known in the art or future-developed for receiving data. As an example, the input unit 204 may be a keyboard, a mouse, a touch screen, a serial port, a scanner, a camera, or a microphone.

The output device 205 may be any type of output unit known in the art or future-developed for displaying or outputting data. As an example, the output device 205 may be a liquid crystal display (LCD) or other type of video display unit, a speaker, or a printer.

Note that the disclosure may also be practiced in a distributed computing environment where tasks or instructions of search engine unit 110 (FIG. 1) are performed by multiple computing units communicatively coupled to the network.

Further note that, the search engine unit 110 (FIG. 1) components may be implemented by software, hardware, firmware or any combination thereof. In the exemplary search engine unit 110, depicted by FIG. 1, all the components are implemented by software and stored in memory 202.

Figure 3:
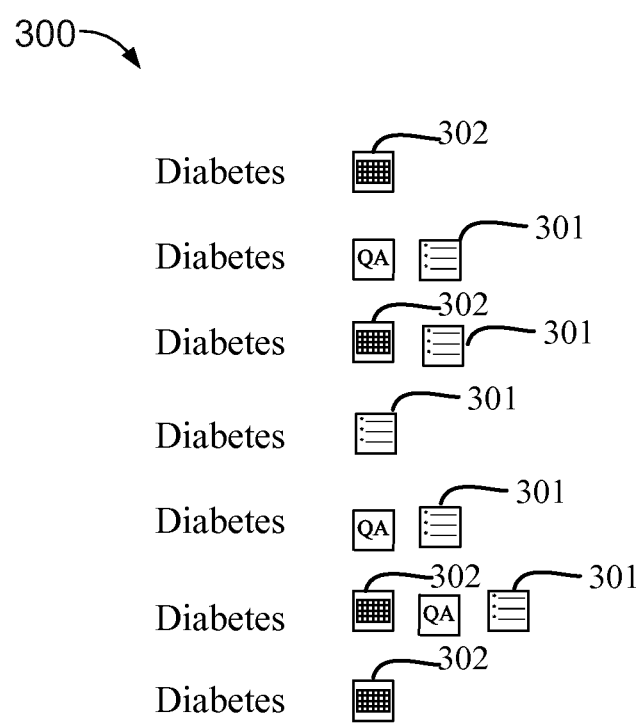
FIG. 3 depicts a portion of exemplary historical search queries having the same keyword that are made available to the search engine unit of FIG. 1.

FIG. 3 illustrates an exemplary portion of historical search queries in accordance with the present disclosure. The queries consist of both keyword(s) and visual element(s). For simplicity sake, the depicted portion of historical search queries all comprise the same keyword i.e., "Diabetes". Further for simplicity, assume that these are the only historical search queries with the keyword "Diabetes". The historical search queries may be stored in storage unit 140 (FIG. 1) and made available to the visual element identification logic 111 (FIG. 1). The visual element identification logic 111 (FIG. 1) may be configured to identify each historical search query visual element(s). The visual element identification logic 111 (FIG. 1) may compute the occurrences of each visual element among all the historical search queries with the same keyword(s). Thus, the visual element identification logic 111 (FIG. 1) identifies list visual element 301 with five occurrences as the most popular visual element, followed by table visual element 302 with four occurrences as the second most popular visual element for a query comprising of keyword "Diabetes".

Thus, for an exemplary user search query comprising of keyword "Diabetes" and exemplary historical search queries as shown in FIG. 3, the visual element identification logic 111 (FIG. 1) may identify and augment the user search query with the list visual element 301. When a search is performed with the augmented search query, the search engine compiles a list of documents wherein the keyword "Diabetes" occurs in a list without the need for the user to specify the relevant list visual element.

If two visual elements are requested for the search query "Diabetes", then the visual element identification logic 111 (FIG. 1) may augment the user search query with the list visual element 301 and the table visual element 302.

Figure 4:
FIG. 4 depicts a table of visual element occurrences count for the exemplary historical search queries of FIG. 3.
Figure 4:
Figure 4:

FIG. 4 displays occurrences of visual elements computed by the visual element identification logic 111 (FIG. 1) for the historical queries shown in FIG. 3. The list visual element 301 (FIG. 3) occurs five times among all the historical queries in FIG. 3 for the search query "Diabetes". Similarly, the table visual element 302 (FIG. 3) occurs four time among all the historical queries in FIG. 3 for the search query "Diabetes". In one embodiment, the occurrences depicted in FIG. 4 may already be made available to the visual element identification logic 111 (FIG. 1) in the storage unit 140 (FIG. 1).

Figure 5:
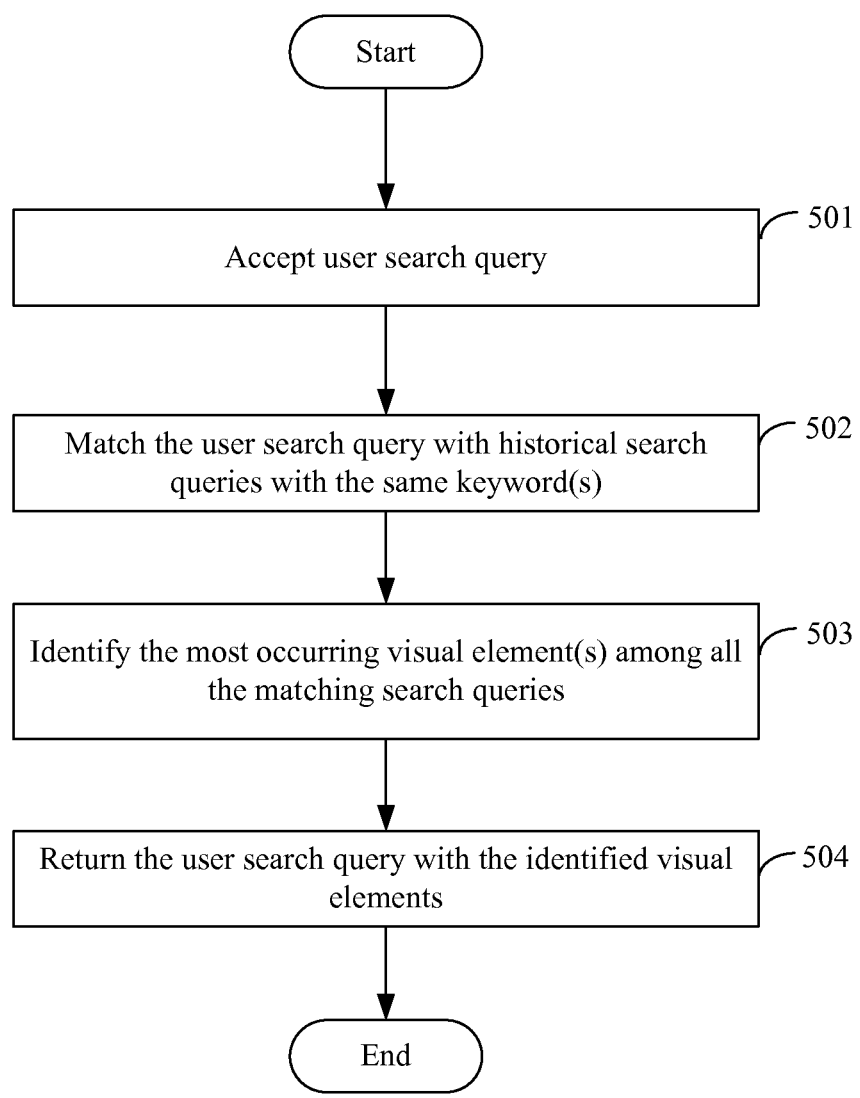
FIG. 5 is a flowchart of a method for augmenting a search query with visual element(s) based on historical data in accordance with one or more embodiments.

FIG. 5 is a flowchart illustrating an exemplary method to identify visual element(s) for a search query in accordance with the present disclosure. In step 501, the visual element identification logic 111 (FIG. 1) of the search engine unit 110 (FIG. 1) may receive a search query or a portion of search query. In step 502, the visual element identification logic 111 (FIG. 1) matches the user search query with the historical search queries from the storage unit 140 (FIG. 1) with the same keyword(s). In step 503, the visual element identification logic 111 (FIG. 1) identifies the most popular visual element(s) among all the matching historical search queries. In step 504, the user search query augmented with the identified visual element(s) is returned to the user.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method executable on a unit comprising a processor for augmenting a search query in an electronic search environment, said method comprising: (a) accepting a user search query comprising of keyword(s) from a client to augment the user search query with one or more visual element suggestions based on a specific criteria, wherein the visual element is selected from a group consisting of paragraph, table, list, menu, fixed width text, key/value, graph/chart, question/answer, timeline and interactive data and wherein the specific criteria is number of occurrences of each visual element in historical search queries comprising of same keyword(s) as the user search query stored in one or more storage units; (b) identifying the visual element(s) associated with each historical search query comprising of same keyword(s) as the user search query; (c) computing, by a processor, the number of occurrences of each visual element in the historical search queries; (d) determining, by the processor, one or more visual element suggestions based on highest number of occurrences of each visual element in the historical search queries; and (e) transmitting the user search query augmented with the one or more visual element suggestions to the client.

2. A search system comprising a search engine unit for augmenting a search query in an electronic search environment, wherein the search engine unit configured to receive a user search query comprising of keyword(s) from a client to augment the user search query with, one or more visual element suggestions based on a specific criteria, wherein the visual element is selected from a group consisting of paragraph, table, list, menu, fixed width text, key/value, graph/chart, question/answer, timeline and interactive data; and wherein the specific criteria is number of occurrences of each visual elements in the historical search queries comprising of same keyword(s) as the user search query stored in one or more storage units; logic configured to identify the visual element(s) associated with each historical search query comprising of same keyword(s) as the user search query, the logic further configured to compute by a processor of the search engine unit the number of occurrences of each visual element in the historical search queries, the logic further configured to determine by the processor one or more visual element suggestions based on highest number of occurrences of each visual element in the historical search queries; and transmitting the user search query augmented with the one or more visual element suggestions to the client.

* * * * *